(12) United States Patent
Christensen et al.

(10) Patent No.: US 7,246,344 B1
(45) Date of Patent: Jul. 17, 2007

(54) DRAG AND DROP STATELESS DATA CLASS SPECIFICATION AND PROGRAMMING

(75) Inventors: Erik B. Christensen, Seattle, WA (US); Patrick M. Dengler, Redmond, WA (US); Paul S. Kuklinski, Jr., Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 09/734,072

(22) Filed: Dec. 11, 2000

(51) Int. Cl.
*G06F 9/44* (2006.01)
(52) U.S. Cl. ......................... 717/109; 717/105; 717/113
(58) Field of Classification Search ........ 717/106–109, 717/113, 174–177, 105; 345/744, 810, 866; 707/103 R–103 Z; 709/202–203, 219, 216
See application file for complete search history.

(56) References Cited

U.S. PATENT DOCUMENTS

| | | | |
|---|---|---|---|
| 5,428,776 A * | 6/1995 | Rothfield | 707/4 |
| 5,742,284 A * | 4/1998 | Duggan et al. | 709/316 |
| 6,005,576 A * | 12/1999 | Kojima et al. | 345/810 |
| 6,189,138 B1 * | 2/2001 | Fowlow et al. | 717/107 |
| 6,199,199 B1 * | 3/2001 | Johnston et al. | 717/107 |
| 6,243,737 B1 * | 6/2001 | Flanagan et al. | 709/202 |
| 6,263,339 B1 * | 7/2001 | Hirsch | 707/102 |
| 6,571,232 B1 * | 5/2003 | Goldberg et al. | 707/2 |
| 6,591,272 B1 * | 7/2003 | Williams | 707/102 |
| 6,823,495 B1 * | 11/2004 | Vedula et al. | 715/805 |
| 6,853,994 B1 * | 2/2005 | Gupta | 707/6 |
| 6,970,887 B1 | 11/2005 | Brigham et al. | |
| 2002/0066074 A1 * | 5/2002 | Jabri | 717/105 |
| 2005/0267906 A1 | 12/2005 | Brigham et al. | |

\* cited by examiner

*Primary Examiner*—Meng-Al T. An
*Assistant Examiner*—Trenton J. Roche

(57) ABSTRACT

A system, method, and article of manufacturer for programming processing operations within a server and more particularly to a system, method, and article of manufacturer for programming processing operations of tracking data through a multi-tier computing architecture. The method includes dragging a graphical representation for a server processing resource from a server explorer module to a visual design surface module to add a processing to a programmable data object being created in the visual design surface module, identifying data schema associated with the server processing resource added to the programmable data object, creating a typed dataset containing the data structures corresponding to the data schema associated with the server processing resource, creating a command adapter to provide data transfer commands within the programmable data object between the programmable data object and the server processing resource, and creating a data transfer connection between the programmable data object and the server processing resource.

23 Claims, 11 Drawing Sheets

FIG. 7a

FillDataSet Method

Public Function XXXXFillDataSet(ByVal dataSet As DataSet {,ByVal {ParameterName} As System.{ParameterType}}) As Long

' Copy input Parameter Values to the Parameter Collection
    DIM vtParameter As Varient
    vtParameter1 = {ParameterName}
    Set {Adapterinstance}.SelectCommand.Parameters.Item(ParameterName.Value=vtParameter1
'Create an error handling block in case filldataset throws an exception
    Try
'Load dataSet from the command
    XXXXXFillDataSet = {AdapterInstance}.FillDataSet(dataset)    — 701
    Catch eFillExecption as Exception
        'if we can do a debug.print without a reference, then we should print the
        'error info to the output window and re-throw the error.
    End

End Function

FIG. 7b  UpdateDataSet Method

Public Function XXXXUodateDataSet (ByVal updateDataSet As DataSet) As Long const DataCursorRowState flag = DataCursorRowState.new | DataCursorRowState.Deleted | DataCursorRowState.ModifiedCurrent;
    DataRow[] datarows = dataTable.Select(" ", " ", flag);

Dim UpdateRows as DataRows()
    Dim NewRows as DataRows()
    Dim DeletedRows as DataRows()

' Get All of the Deleted Rows and Update the Data Store
    DeletedRows = UpdateDataSet.Select(" ", " ", DataCursorRowState.Deleted)
    If 0 < dataRowLength then
        Update(DeletedRows, AdapterInstance.DefaultSourceTableName);
    End If ' Get All of the Updates Rows and Update the Data Store
    UpdatedRows = UpdateDataSet.Select(" ", " ", DataCursorRowState.ModifiedCurrent)
    If 0 < dataRowLength then
        Update(DeletedRows, AdapterInstance.DefaultSourceTableName);
    End If ' Get All of the New Rows and Update the Data Store
    NewRows = UpdateDataSet.Select(" ", " ", DataCursorRowState.New)
    If 0 < dataRowLength then
        Update(DeletedRows, AdapterInstance.DefaultSourceTableName);
    End If

End Function

FillAllDataSet

Public Sub FillAllDataSet(ByVal dataset As DataSet(, ByVal Parameters As System.{ParameterType})

' The line below is added for each adapter on the Virtual Design Surface
    ' Passing into the function only the necessary parameters
    (AdapterName1)FillDataSet dataset{, _parameters}
    (AdapterName2)FillDataSet dataset{, _parameters}
    *
    *
    *
    (AdapterNameN)FillDataSet dataset{, _parameters}

End Sub

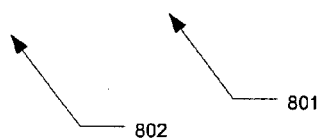

FIG. 8b

UpdateAllDataSet

Public Sub Update{DataSetName} (ByVal dataset As DataSet)

' The line below is added for each adapter on the Virtual Design Surface (AdapterName1)Update dataSet
    (AdapterName2)Update dataSet
    *
    *
    *
    (AdapterNameN)Update dataSet

End Sub

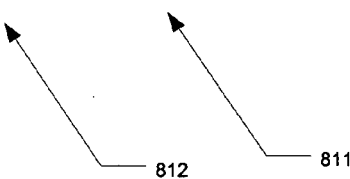

FIG. 9

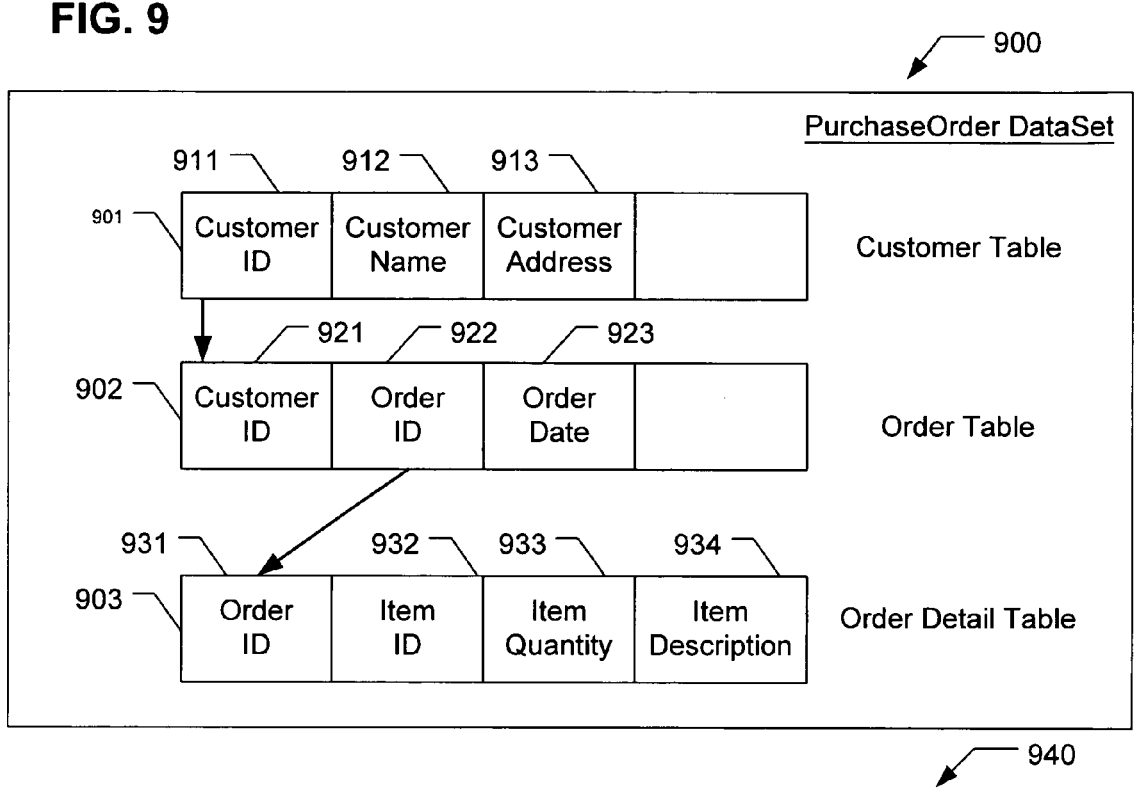

PurchaseOrder DataSet

- 911: Customer ID
- 912: Customer Name
- 913: Customer Address
- 901: Customer Table row
- 921: Customer ID
- 922: Order ID
- 923: Order Date
- 902: Order Table row
- 931: Order ID
- 932: Item ID
- 933: Item Quantity
- 934: Item Description
- 903: Order Detail Table row

Public Sub FillAllDataSet(ByVal PurchaseOrder As DataSet(, ByVal Parameters As System.{ParameterType}))

CustomerFillDataSet PurchaseOrder(, _parameters}
    OrderFillDataSet PurchaseOrder(, _parameters}
    OrderDetailFillDataSet PurchaseOrder(, _parameters}      ← 941

End Sub

Public Sub UpdateAll (ByVal PurchaseOrder As DataSet)      ← 942

' The line below is added for each adapter on the Virtual Design Surface

OrderDetailUpdate (PurchaseOrder, Filtered (Delete))
    OrderUpdate (PurchaseOrder, Filtered (Delete))
    CustomerUpdate (PurchaseOrder, Filtered (Delete))      ← 943

' The line below is added for each adapter on the Virtual Design Surface

OrderDetailUpdate (PurchaseOrder, Filtered (Insert | Update))
    OrderUpdate (PurchaseOrder, Filtered (Insert | Update))
    CustomerUpdate (PurchaseOrder, Filtered (Insert | Update))      ← 944

End Sub

DRAG AND DROP STATELESS DATA CLASS SPECIFICATION AND PROGRAMMING

TECHNICAL FIELD

The present invention relates to a system, method, and article of manufacturer for programming processing operations within a server and more particularly to a system, method, and article of manufacturer for programming processing operations within a multi-tier client-server architecture.

BACKGROUND

Building scalable client-server based applications has increased in importance recently with the increase in the use of the Internet as a mechanism to connect potential users of data, data sources, and processing resources with these various data sources and processing resources. These applications that previously were required to scale to a potential of 100 or more simultaneous users are now potentially exposed to millions of simultaneous users of the Internet. To effectively build these applications, multi-tiered application architectures that are implemented using a multi-tiered processing architecture have been developed to provide the needed level of scalability.

In prior implementations of these applications, a client manipulating a database is directly connected to the database and maintains that connection during manipulation of the data. This type of architecture allows for easy data synchronization between the client and the database. However, this type of computer architecture places limits on the number of clients that might work with the database at any one time; or in other words, this architecture is not scalable. In other data structure architectures, a multi-tier architecture, such as a three-tier architecture, is used. The client comprises the first tier. The second tier includes servers that contain the business logic that may be easily replicated or scaled to meet the needs of the number of simultaneous users of the system. The third tier contains the one or more database connected to the second tier processors.

In the multi-tier architecture, the client makes a request to the second tier for data. A server in the second tier pulls the data from the database located within the third tier and sends a snapshot of the data to the client. The client can make changes to the data, such as update the data, add data, or delete data. The changes are sent back to the second tier. Upon return of the data from the client, the client request may or may not be routed to the same server that sent the data to the client originally. Each processing request from the client to the server/database is separately routed to an appropriate server within the second tier of the architecture based upon any number of factors related to the current processing loads and operating environments of the servers when the request is made.

Because of the fact that data sent between a client and a database may be routed through different processing servers, a stateless organization of data objects is needed. In such objects, each processing operation does not depend upon the processing module performing an operation to know what has occurred in prior operations that may have been performed. As a result, each request may be handled by any server on a request by request basis.

Programming the interaction of the various levels of a multi-tiered architecture for these applications using a stateless data object design presents a number of programming problems that ensure that each level of the architecture is operating upon a consistent implementation of the data model. The present invention provides a method, system, and article of manufacturer for constructing a consistent implementation of a stateless data object that is implemented across all of the processing levels in a multi-tiered processing architecture.

SUMMARY

In one aspect of the present invention, a method of tracking data through a multi-tier computing architecture is provided. The method includes dragging a graphical representation for a server processing resource from a server explorer module to a visual design surface module to add a processing to a programmable data object being created in the visual design surface module, identifying data schema associated with the server processing resource added to the programmable data object, creating a typed dataset containing the data structures corresponding to the data schema associated with the server processing resource, creating a command adapter to provide data transfer commands within the programmable data object between the programmable data object and the server processing resource, and creating a data transfer connection between the programmable data object and the server processing resource.

In another aspect of the present invention, a computer program product readable by a computing system and encoding instructions for a computer process for tracking data through a multi-tier computing architecture is provided. The computer process comprises instructions analogous to that described above.

In another aspect of the present invention, a computing system creating programmable data objects for use in a multi-tier computing architecture is provided. The computing system includes a memory module, a user interface module, a mass storage system, and a programmable processing module. The programmable processing module performing a sequence of operations used to implement a computing process analogous to the method described above.

In another aspect of the present invention, a system for creating programmable data objects for use in a multi-tier computing architecture. The system has a server explorer module for presenting one or more processing resources present on a server to a programmer for use in creating a programming object class and a visual design surface module for performing the operations associated with creating, editing, and saving the programming object. The visual design surface module includes a drag/drop module for enabling a programmer to select a server resource from the server explorer module and place the selected server resource within a data object on the visual design surface module. The visual design surface module also includes a command adapter function generation module for generating a data processing object associated with the drag and drop of a server processing resource, a typed dataset generation module for generating typed dataset object associated with the drag and drop of a server processing resource, an init generation module for generating the set of data processing functions and methods associated with the drag and drop of a server processing resource, and a properties edit module for retrieving the properties and source code for the various objects within the visual design surface module for editing.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its scope may be obtained from the accompanying drawings, that are described below, from the following detailed descriptions of presently preferred embodiments of the invention and from the appended claims.

BRIEF DESCRIPTION OF THE DRAWINGS

Referring now to the drawings in which like reference numbers represent corresponding parts throughout:

FIGS. 7a and 7b illustrate an example set of programming instructions used to implement FillDataSet and UpdateDataSet functions according to one embodiment of the present invention.

FIGS. 8a and 8b illustrate an example set of programming instructions used to implement FillAllDataSet and UpdateAllDataSet functions according to one embodiment of the present invention.

FIG. 9 illustrates an example class programming object created by a component designer module according to one embodiment of the present invention.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

In general, the present disclosure describes a system, method, and article of manufacturer for programming processing operations within a multi-tier client-server architecture. The multi-tier client-server architecture uses a stateless data transfer programming model in which the remote client communicates with data sources and processing resources present on servers using a sequence of message transfers. These messages are considered stateless when both the client and the server do not use a connected processing model in which both processes immediately communicate changes made to the shared data values as they are being modified or updated. The stateless programming model is a non-connected model in which the processes communicate using messages-response pairs that are treated as separate and independent data transactions.

The stateless programming model is useful in allowing a web server to easily scale using a collection of identical processing devices as each server process within the scaled web server will receive a request message and will in turn generate a response message. Because the messages are able processed as independent transactions, each message-response pair sent and received from a particular client may be processed by a different server process running on any of the identical processing devices within the scaled web server.

A stateless programming model running on a multi-tier client-server architecture uses diffgrams, messages, or datasets to track changes to the snapshots of data as the snapshots move through the different tiers of a multi-tier computing architecture. Preferably, the dataset includes two row pointers for a block of data. The first row pointer is called the original row. The second row pointer is called the current row. By comparing the two row pointers, or the current to the original, the current state of the data can be determined as original, new, updated, or deleted. Thus, the data can be synchronized and tracked across the tiers of a multi-tier architecture on a message-response pair basis. Additional details of the use of the diffgrams to implement a stateless programming model within a multi-tier processing architecture is disclosed within a commonly assigned U.S. patent application titled "METHOD A FOR PROGRAMMING DISCONNECTED DATA," Ser. No. 09/734,421, filed Dec. 11, 2000, which is incorporated herein by reference.

Figure 1:
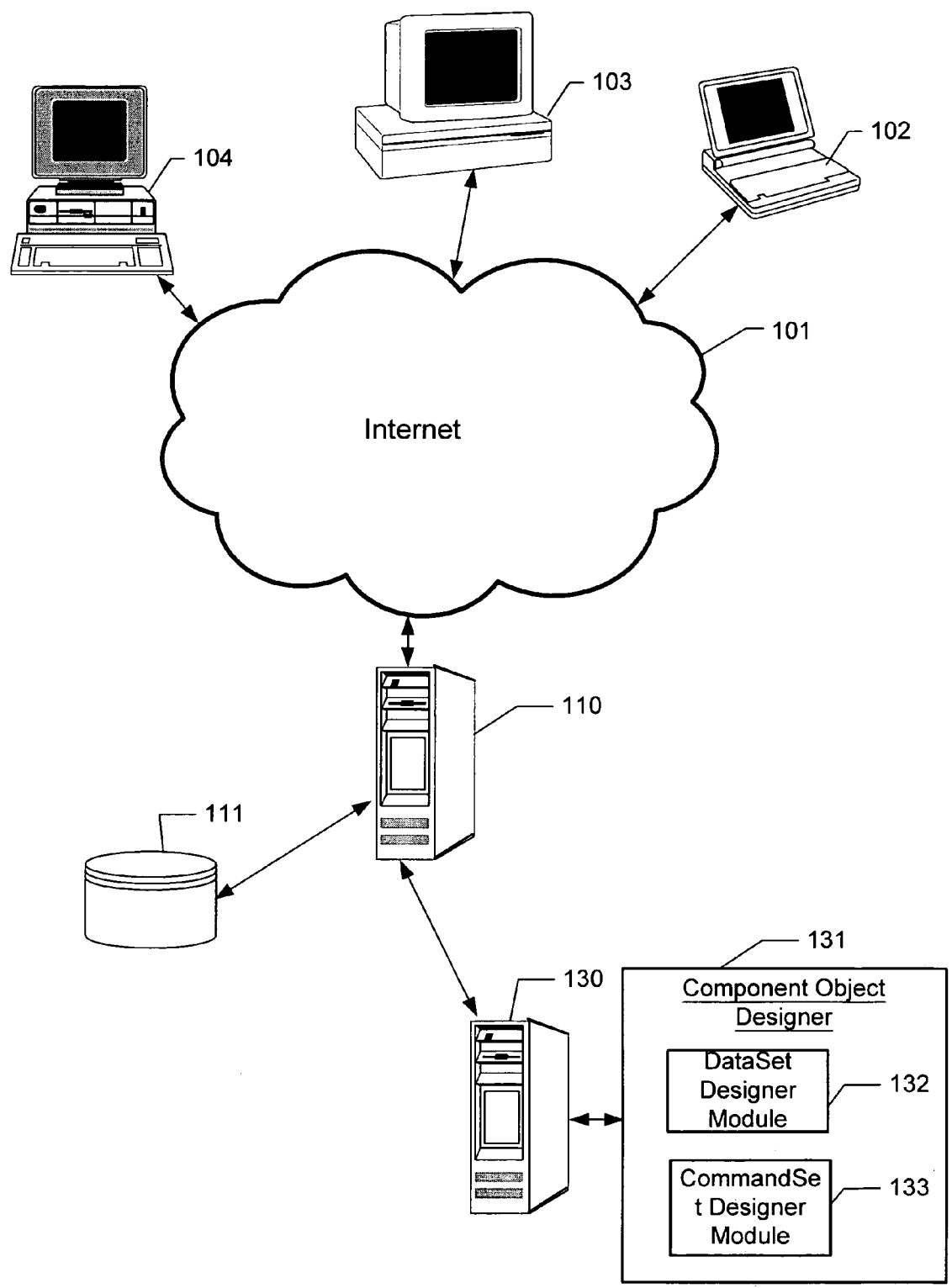
FIG. 1 illustrates an Internet based web server system utilizing an improved database system according to one embodiment of the present invention.

FIG. 1 illustrates an Internet based web server system that may be used to implement aspects of one embodiment of the present invention. The web server system 100 includes one or more connected web servers 110 that accesses data stored on a database mass storage device 111. This database 111 is accessed by one or more users using web browsers executing within their computers 102-104 and communicating with the web server 110 over the Internet 101. In this embodiment, the client 103, for example, uses a web browser to communicate using the http communications protocol to send a URL which includes request information across the Internet 101 to the web server 110. The request information included within the URL typically specifies a database request. The web server 110 processes the URL to obtain the database request information to be supplied to the database 111 resulting in the invocation of the database request specified by the user.

Once the database request is complete, the web server 110 generates the HTML representation for a web page that contains the data corresponding to a result set generated when the database request is applied to the database 111. This HTML representation of the web page is transmitted back across the Internet 101 to the user's computer 103 for display to a user using the web browser. This process of sending a database request, generating the results, generating the HTML web page representation of the results, and returning the representation to the user occurs each time a user using, his or her computer 103, communicates over the Internet to a web server 110 having a database 111.

Because the number of simultaneous requests for data sent to the web server 110 from various client computers 103 can both be large and significantly different for each use of a web server, the architecture of the web server system 100 typically attempts to be scalable in allowing a plurality of identical web servers 110 are interconnected to both the Internet 101 and the database 111. Programming the functionality of the web server system 100 in which such a multi-tier architecture is used requires a programming system 131 that creates and modifies software that is executed within a client computer 103, a web server 110, and a database 111. In addition, the interaction of the operation of the software from each of these levels within the multi-tier architecture needs to be specified to interact with the other levels of the architecture in a consistent manner. The programming system 131 disclosed herein assists in this programming of a dataset used in the stateless programming model using a dataset designer module 132. The programming system 131 also assists in the creation and modification of the command set executed upon the web server 110 as this communication occurs.

In one embodiment, the web server provides a web service that allows a process executing upon a client computer 102-104 to execute an operation upon the web server by transmission of an http message across the Internet 101. The http message references a function exposed within a class resident upon the web server 110. Data to be processed by the processing operation may be sent as part of the http request. This data may be included within a structured data organization if the data is specified and transmitted within an extensible programming data object such as an XML data object. The data object is processed by the exposed function to generate a response. This response may, itself, include a representation of a resultant dataset that may also be expressed within an XML data object.

Because the design of the dataset to be used within the client 102-104 and the web server 110 and the creation of the sequence of operating instructions needed by the web server 110 to perform these tasks are difficult to create, a programming system 131 is used to assist in the specification of these objects. The use of a single, integrated programming tool allows the tool 131 itself to ensure that the specific details and inter-dependencies between the dataset and its supporting instructions are consistent and operate correctly.

Figure 2:
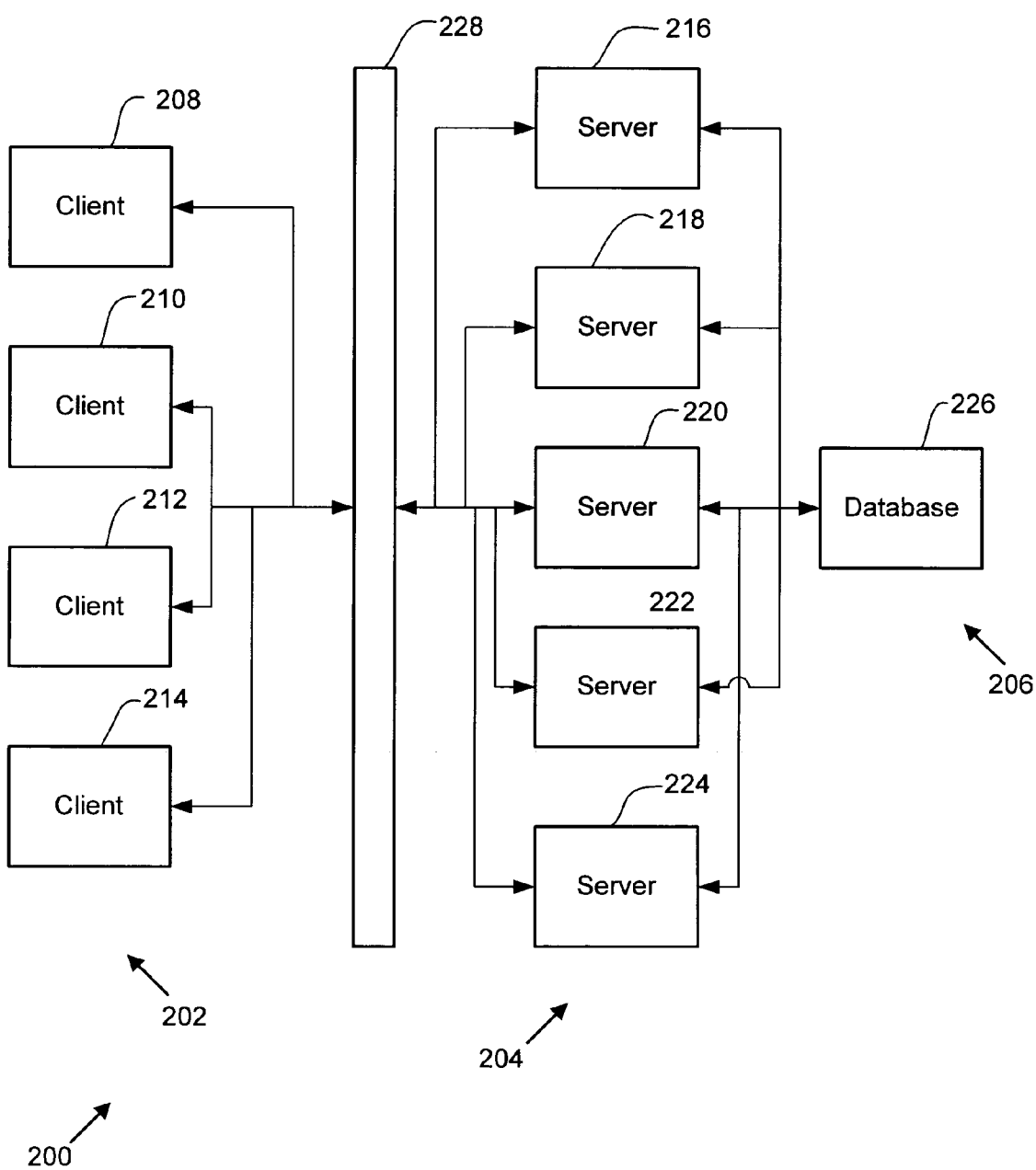
FIG. 2 illustrates a multi-tier architecture that may be used to implement aspects of an embodiment of the present invention.

FIG. 2 illustrates a schematic representation of a multi-tier architecture that may be used to implement aspects of an embodiment of the present invention. An exemplary environment 200 for implementing embodiments of the present invention includes a multi-tier architecture comprising a client tier 202, a server tier 204, and a database tier 206. This multi-tier architecture is common, for example, in applications related to the World Wide Web or Internet. The client tier 202, the server tier 204, and the database tier 206 might contain any number of computing systems, for example, a computing system 300 as described in connection with FIG. 3. In the embodiment illustrated in FIG. 2, the client tier 202 includes a plurality of client computing systems 208, 210, 212, 214. Likewise, the server tier 204 includes a plurality of server computing systems 216, 218, 220, 222, 224. The database tier 206 includes a database 226. Of course, the database tier 206 could also contain multiple databases. This exemplary environment is commonly referred to as a three-tier architecture.

In this three-tier architecture, the database tier 206 is the ultimate repository of information or data. The client tier 202 provides the user-interface logic for interfacing with a user of the three-tier architecture. The server tier 204 typically contains the business rules and controls the interface between the client tier 202 and the database tier 206. The client tier 202 typically interacts with the server tier 204, which in turn interacts with the database tier 206 to update the database 226 and retrieve data from the database.

Many users can interface with the server tier 204 simultaneously through a router 228. As stated previously, the client tier 202 might contain several, thousands, or millions of client computing systems 208, 210, 212, 214, for example a web browser or a rich client. All of these computing systems 208, 210, 212, 214 interact with the router 228 sending requests to the server tier 204 for information and receiving information back from the server tier 204. For example, the client computing system 208 might request a list of books for sale from the server tier 204. The client computing system 208 sends the request to the router 228. The router 228 routes the request to a server computing system, such as the server computing system 216, for example a web server or network server. The router 228 might be a dumb router or a smart router as is commonly known. Preferably, the router 228 routes the client requests based on load. In other words, the router 228 determines which server computing system 216, 218, 220, 222, 224 in the server tier 204 has the most capacity available at the time of the request.

The server computing system 216 receives the request from the client computing system 208, through the router 228, and accesses the database 226 to retrieve the requested information. The database 226 sends the requested information to the server computing system 216. The server computing system 216 processes or formats the information and returns the resulting information to the client computing system 208 through the router 228 for use by the user. As the number of requests to the server tier 204 increases, more server computing systems can be added to the server tier 204. Thus, the multi-tier architecture is scalable.

Figure 3:
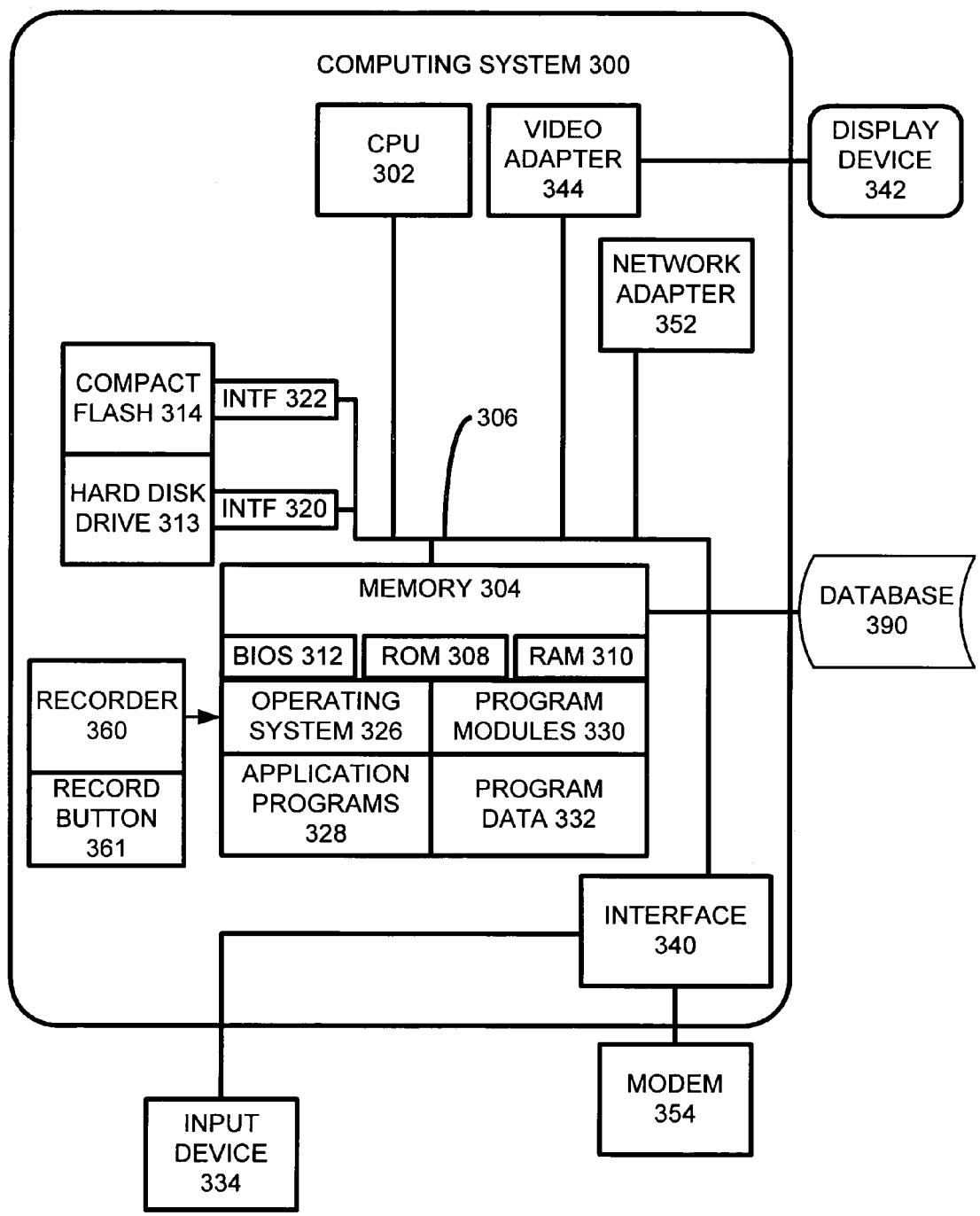
FIG. 3 illustrates a computing system that may be used to implement aspects of the embodiments of the present invention.

FIG. 3 illustrates a schematic representation of a computing system that may be used to implement aspects of the embodiments of the present invention. An exemplary environment for implementing embodiments of the present invention includes a general purpose computing device in the form of a computing system 300, including at least one processing system 302. Such a computing system 300 might be used in the client tier 202, the server tier 204, and/or the database tier 206 of the multi-tier architecture 200 described above.

A variety of processing units are available from a variety of manufacturers, for example, Intel or Advanced Micro Devices. The computing system 300 also includes a system memory 304, and a system bus 306 that couples various system components including the system memory 304 to the processing unit 302. The system bus 306 might be any of several types of bus structures including a memory bus, or memory controller; a peripheral bus; and a local bus using any of a variety of bus architectures.

Preferably, the system memory 304 includes read only memory (ROM) 308 and random access memory (RAM) 310. A basic input/output system 312 (BIOS), containing the basic routines that help transfer information between elements within the computing system 300, such as during start-up, is typically stored in the ROM 308.

Preferably, the computing system 300 further includes a secondary storage device 313, such as a hard disk drive, for reading from and writing to a hard disk (not shown), and a compact flash card 314.

The hard disk drive 313 and compact flash card 314 are connected to the system bus 306 by a hard disk drive interface 320 and a compact flash card interface 322, respectively. The drives and cards and their associated computer-readable media provide nonvolatile storage of computer readable instructions, data structures, program modules and other data for the computing system 300.

Although the exemplary environment described herein employs a hard disk drive 313 and a compact flash card 314, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 313, compact flash card 314, ROM 308, or RAM 310, including an operating system 326, one or more application programs 328, other program modules 330, and program data 332. A user may enter commands and information into the computing system 300 through an input device 334. Examples of input devices might include a keyboard, mouse, microphone, joystick, game pad, satellite dish, scanner, and a telephone. These and other input devices are often connected to the processing unit 302 through an interface 340 that is coupled to the system bus 306. These input devices also might be connected by any number of interfaces, such as a parallel port, serial port, game port, or a universal serial bus (USB). A display device 342, such as a monitor, is also connected to the system bus 306 via an interface, such as a video adapter 344. The display device 342 might be internal or external. In addition to the display device 342, computing systems, in general, typically include other peripheral devices (not shown), such as speakers, printers, and palm devices.

When used in a LAN networking environment, the computing system 300 is connected to the local network through a network interface or adapter 352. When used in a WAN networking environment, such as the Internet, the computing system 300 typically includes a modem 354 or other means, such as a direct connection, for establishing communications over the wide area network. The modem 354, which can be internal or external, is connected to the system bus 306 via the interface 340. In a networked environment, program modules depicted relative to the computing system 300, or portions thereof, may be stored in a remote memory storage device. It will be appreciated that the network connections shown are exemplary and other means of establishing a communications link between the computing systems may be used.

The computing system 300 might also include a recorder 360 connected to the memory 304. The recorder 360 includes a microphone for receiving sound input and is in communication with the memory 304 for buffering and storing the sound input. Preferably, the recorder 360 also includes a record button 361 for activating the microphone and communicating the sound input to the memory 304.

Figure 4:
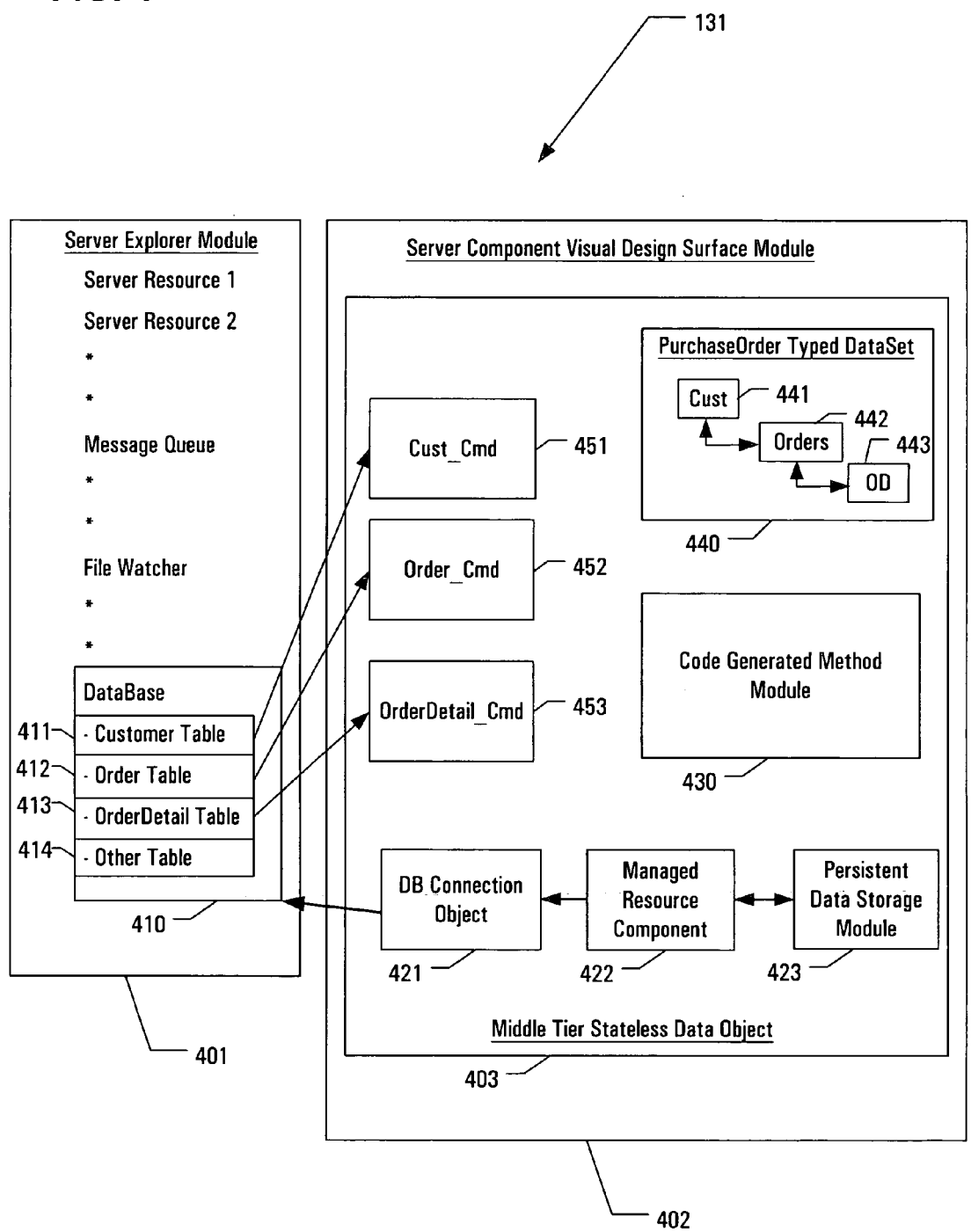
FIG. 4 illustrates an example embodiment of a component designer module used to create component datasets and supporting programming object classes according to the present invention.

FIG. 4 illustrates an example embodiment of a component designer module used to create component datasets and supporting programmable data object classes according to the present invention. The programming system, or component designer module 131, includes a server explorer module 401 and a component visual design surface module 402. The server explorer module 401 presents one or more processing resources present on a server to a programmer for use in creating a programming object class. These resources include various processing resources available for use by a client to perform any number of processing operations. These resources may include a message queue, a file watching process, an event manager, print server process, a file system, and a database.

In an example embodiment, a database 410 present on the server consists of a number of database tables, including a Customer table 411, an Order table 412, an OrderDetail table 413, and an Other table 414. Various tables within this database 410 are used to construct a Middle Tier Stateless Data Object 403 within the component visual design surface module 402. In the example embodiment shown, three of the four tables, the Customer table 411, the Order table 412, and the OrderDetail table 413, are included within the Middle Tier Stateless Data Object 403 in order to permit a client process to communicate with the database 410 through the Middle Tier Stateless Data Object 403.

The three database tables 411-413 are inserted into the Middle Tier Stateless Data Object 403 when a programmer selects each table using an input pointing device such as a mouse, trackball, track pad, or similar input device to place a cursor upon each table's graphical display element, such as an icon, and highlight the tables. The selected tables 411-413 are dragged from the Server Explorer module 401 to the Component Visual Design Surface module 402 and placed within the Middle Tier Stateless Data Object 403. This drag and drop operation causes a set of items to be created within the Middle Tier Stateless Data Object 403. The created items include a command adapter module 451-453 for each of the tables placed in the Middle Tier Stateless Data Object 403.

The placement of a first table from a database 410 causes the creation of a DB Connection Object 421, its corresponding Managed Resource Component module 422, and a Persistent Data Storage module 423. The DB Connection Object 421 includes a set of processing functions to create and manage a data transfer connection between the Middle Tier Stateless Data Object 403 and the database 410. This data transfer connection is used by the command adapter modules 451-453 at run time to retrieve and store data within the database 410 using the corresponding database tables 411-413.

The Managed Resource Component 422 provides the DB Connection Object 421 with the necessary address and identification information to establish the data transfer connection. The Managed Resource Component 422 obtains this address and identification information from the Persistent Data Storage module 423. This collection of modules permit the data transfer connection to be established to a different database when the Middle Tier Stateless Data Object 403 is deployed by simply changing the contents of the Persistent Data Storage module 423. The Middle Tier Stateless Data Object 403 is created and tested using a sample database 410 that contains a set of database tables 411-414 identical to a set of database tables found in a production database. When the Middle Tier Stateless Data Object 403 is deployed, the Managed Resource Component 422 will allow the data transfer connection to be easily redirected from the sample database 410 to a production database.

As stated above, the drag and drop operation of the database tables causes a command adapter module 451-453 for each of the tables placed in the Middle Tier Stateless Data Object 403. In the example embodiment shown in FIG. 4, a Cust_Cmd adapter module 451 is added to the Middle Tier Stateless Data Object 403 when the Customer Table 411 is dragged to the Middle Tier Stateless Data Object 403.

Similarly, an Order_Cmd adapter module 452 is added to when the Order Table 412 is dragged to the Middle Tier Stateless Data Object 403. Finally, an OrderDetail_Cmd adapter module 453 is added when the OrderDetail Table 413 is dragged to the Middle Tier Stateless Data Object 403. Each of these three command adapters 451-453 permit the Middle Tier Stateless Data Object 403 to retrieve data from the database 410 and to store data into the database 410 using the corresponding database table 411-413. The drag and drop operation causes the database schema, as defined by the definition of the fields, and their corresponding data types, within the database tables 411-413, to be included within the Middle Tier Stateless Data Object 403.

The drag and drop operation of the database tables 411-413 also creates a typed dataset 440 that also includes this schema and typed table information. In the example embodiment of FIG. 4, this dataset 440 comprises a PurchaseOrder Typed DataSet that has a customer table 441, an Orders table 442, and an OrderDetails table 443. The definition of these three tables corresponds exactly to the definition of the corresponding database table definition 411-413 found in the database 410. In addition, any relationships between the fields within the various tables in the database 410 are maintained within the PurchaseOrder Typed DataSet 440. This typed dataset 440 is the dataset exposed to the client process that communicates with the database 410 through the Middle Tier Stateless Data Object 403. This typed dataset 440 may be specified using an extensible programming language, such as XML, along with the data stored within the dataset when a client process is communicating with the Middle Tier Stateless Data Object 403.

The drag and drop operation of each resource from the Server Explorer module 401 also causes the creation of a set of processing methods within a Code Generated Method module 430. These processing methods perform the necessary processing operations to support the functions performed by the resource added to the Middle Tier Stateless Data Object 403. These methods include any initialization processing that must occur to support the resource. Each resource will have a default set of processing methods to be included in the Code Generated Method module 430.

All of the processing items created on the component visual design surface module 402 within a Middle Tier Stateless Data Object 403 contain the programmable data objects and supporting processing functions and methods that when compiled will create an executable data object that will operate within a middle tier of the multi-tier processing system. The component visual design surface module 402 may present the data object 403 as a graphical display of a collection of elements. The component visual design surface module 402 may also display the source code used to specify the processing items and their respective supporting functions and methods. As such, a programmer may alter the source code for any processing item within the component visual design surface module 402 by displaying the source code and making the alterations. When the changes are saved, the component visual design surface module 402 will incorporate these changes into all other processing items as necessary.

For example, a programmer may wish to change the data type of a field within a command adapter module. This change will cause the same change to be made to the corresponding field in the typed dataset 440 as well as any necessary changes within the processing functions and methods 430 that support the use of this database table.

Figure 5:
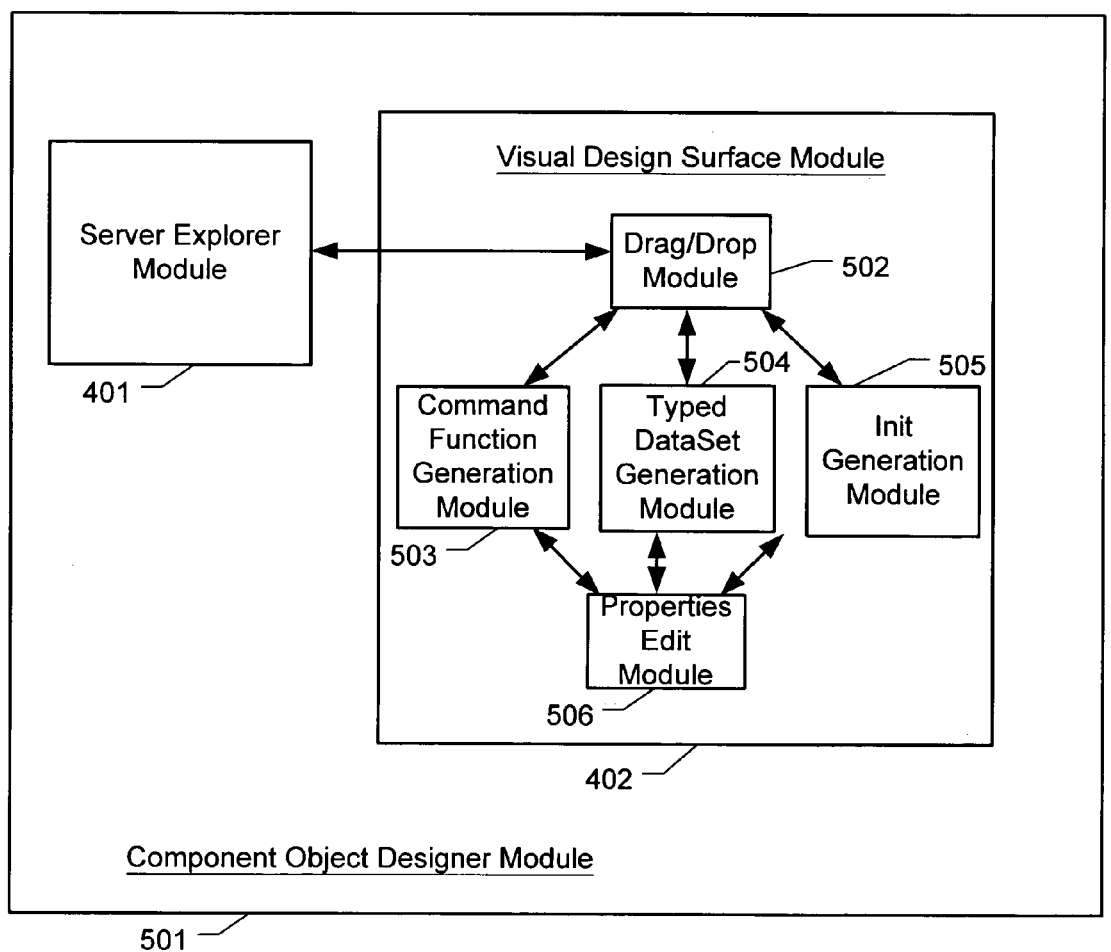
FIG. 5 illustrates another embodiment of a component designer module used to create component datasets and supporting programming object classes according to the present invention.

FIG. 5 illustrates another embodiment of a component designer module used to create component datasets and supporting programmable data object classes according to the present invention. The component object designer module 501 includes a server explorer module 401 and a visual design surface module 402. The server explorer module 401 presents one or more processing resources present on a server to a programmer for use in creating a programmable data object class as discussed above. The server explorer module 401 presents graphical representations for these resources to a programmer for use in the drag and drop operations.

The visual design surface module 402 includes a set of processing modules to perform the operations associated with creating, editing, and saving the middle tier data object 403. These processing modules in the visual design surface module 402 include a drag/drop module 502, a command adapter function generation module 503, a typed dataset generation module 504, an init generation module 505, and a properties edit module 506. The drag/drop module 502 performs the operations necessary to permit a programmer to select a server resource from the server explorer module 401 and place it within a programmable data object within the visual design surface module 402. The drag/drop module 502 also causes the other processing modules in the visual design surface module 402 to perform their operations to complete the drag/drop process of a server resource onto the visual design surface module 402.

The command adapter function generation module 503 generates programmable data objects associated with the drag and drop of a server processing resource. In the example embodiment of FIG. 4, the command adapter function generation module 503 generates the three command adapter modules 451-453 and all of the processing functions contained within these processing items. The command adapter function generation module 503 also accepts an updated command adapter module that has been edited by the properties edit module 506 and generates the updated source code for the functions within the command adapter modules.

The typed dataset generation module 504 generates typed dataset object associated with the drag and drop of a server processing resource. In the example embodiment of FIG. 4, the typed dataset generation module 504 generates the typed dataset module 440 and all of the processing functions contained within this dataset object. The typed dataset generation module 504 also accepts an updated typed dataset module that has been edited by the properties edit module 506 and generates the updated source code for the functions within the typed dataset module.

The init generation module 505 generates the set of data processing functions and methods associated with the drag and drop of a server processing resource. In the example embodiment of FIG. 4, the init generation module 505 generates the processing functions and methods within the Code Generated Method module 430. The init generation module 505 also accepts an updated Code Generated Method module that has been edited by the properties edit module 506 and generates the updated source code for the functions within the command adapter modules.

The properties edit module 506 permits a programmer to retrieve the properties and source code for the various objects within the visual design surface module 402 for editing. When a programmer has completed editing an object from the visual design surface module 402, the properties edit module 506 updates the module using the various object generation modules 503-505 discussed above.

The properties edit module 506 also identifies all other objects within the visual design surface module 402 that are affected by the changes made by the update operations. Each of these other objects are also updated using the various object generation modules 503-505 discussed above.

Figure 6:
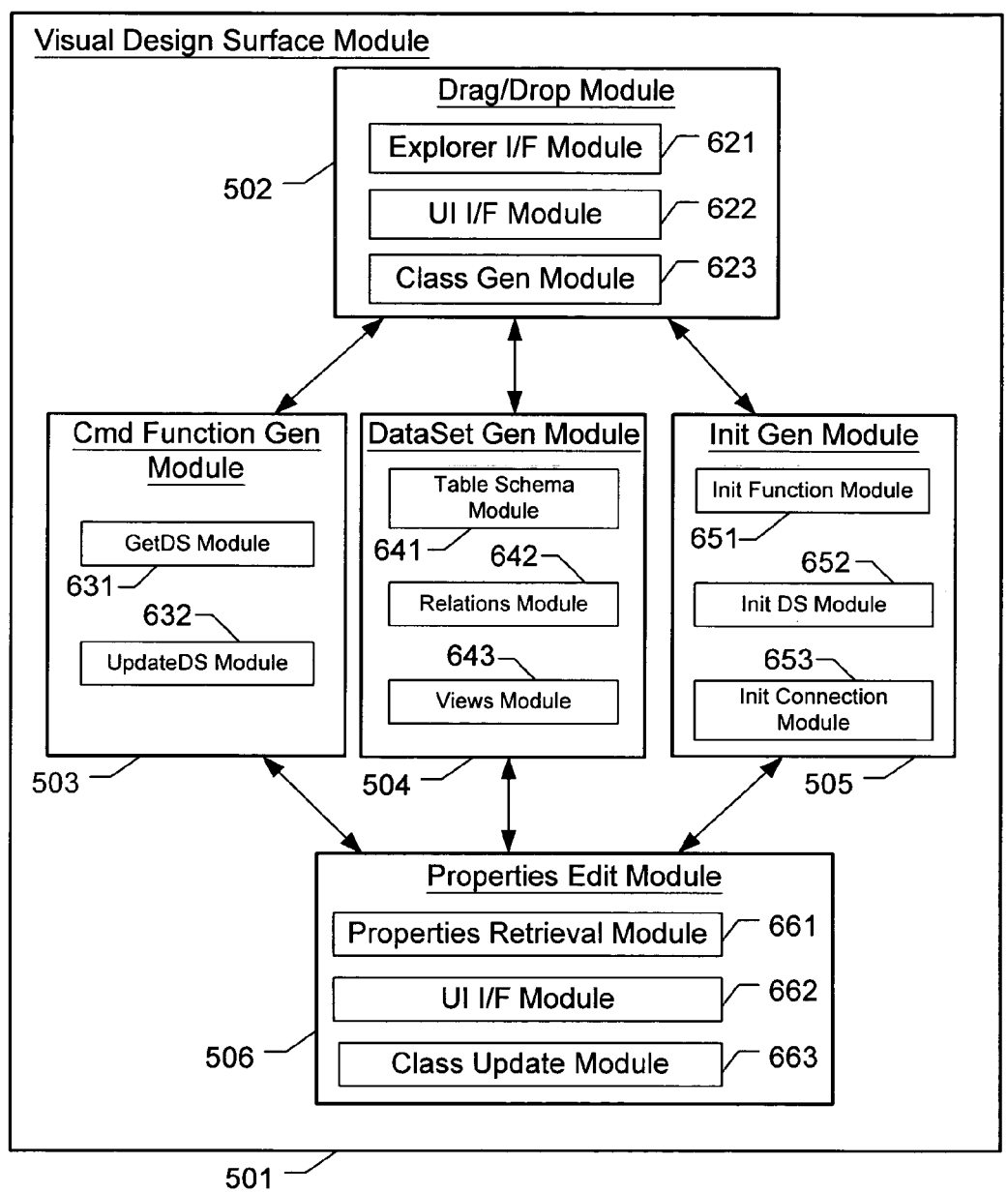
FIG. 6 illustrates an example embodiment of a virtual design surface module used to create component datasets and supporting programming object classes according to the present invention.

FIG. 6 illustrates an example embodiment of a virtual design surface module used to create component datasets and supporting programming object classes according to the present invention. As discussed above, the visual design surface module 402 includes a drag/drop module 502, a command adapter function generation module 503, a typed dataset generation module 504, an init generation module 505, and a properties edit module 506. The drag/drop module 502 includes an explorer interface module 621 to permit a programmer to select a server resource from the server explorer module 401 and place it within a programmable data object within the visual design surface module 402. The explorer interface module 621 uses a user interface module 622 to perform the visual display and command input operations associated with the drag/drop operation. A class generation module 623 causes the other processing modules in the visual design surface module 402 to perform their operations to complete the drag/drop process of a server resource onto the visual design surface module 402.

The command adapter function generation module 503 generates data processing object associated with the drag and drop of a server processing resource. In the example embodiment of FIG. 4, the command adapter function generation module 503 generates two functions, a GetDataSet function and an UpdateDataSet function. The GetDataSet function is generated by a GetDS module 631 which uses the database table definition to define how the database data is to be obtained and presented. Similarly, the UpdateDataSet function is generated by a UpdateDS module 632 which uses the database table definition to define how the database data is to be maintained and stored in the database. The GetDS module 631 and the UpdateDS module 632 perform these same operations upon an updated command adapter module that has been edited by the properties edit module 506 and generates the updated source code for the functions within the command adapter modules.

The typed dataset generation module 504 generates typed dataset object using a Table Schema module 641, a Relations module 642, and a Views module 643. In the example embodiment of FIG. 4, the typed dataset generation module 504 generates the Purchase Order typed dataset module 440 and all of the processing functions contained within this programmable dataset object. The Table Schema module 641 generates the table records from the database schema within the programmable dataset object. The Relations module 642 generates the relationship data for the fields within the records within the dataset based upon the corresponding relationship data from the database. The Views module 643 generates the database views data for the records within the dataset based upon the corresponding views data from the database. The Table Schema module 641, the Relations module 642, and the Views module 643 also process an updated typed dataset module that has been edited by the properties edit module 506 and generates the updated source code for the functions within the typed dataset module.

The init generation module 505 generates the set of data processing functions and methods using an Init Function module 651, an InitDataSet module 652, and an InitConnection module 653. In the example embodiment of FIG. 4, the Init Function module 651 generates the processing functions and methods within the Code Generated Method module 430 associated with the command adapter modules. The InitDataSet module 652 generates the processing functions and methods within the Code Generated Method module 430 associated with the type dataset class. The InitConnection module 653 generates the processing functions and methods within the Code Generated Method module 430 associated with the data transfer connection between the Middle Tier Data Object and the database. These three modules 651-653 also accepts an updated Code Generated Method module that has been edited by the properties edit module 506 and generates the updated source code for the functions within the command adapter modules.

The properties edit module 506 permits a programmer to retrieve the properties and source code for the various objects within the visual design surface module 402 for editing using a Properties Retrieval module 661. The properties and source code are presented to the programmer, and edits accepted from the programmer by a User Interface module 662. When a programmer has completed editing an object from the visual design surface module 402, a class update module 663 updates the edited object using the various object generation modules 503-505 discussed above. These three modules 661-663 also identify all other objects within the visual design surface module 402 that are affected by the changes made by the update operations. Each of these other objects are also updated using the various object generation modules 503-505 discussed above.

FIGS. 7a and 7b illustrate an example set of programming instructions used to implement FillDataSet and UpdateDataSet functions according to one embodiment of the present invention. The first of these two processing functions perform the GetDataSet function that obtains the database data needed to fill the dataset and places it within the typed dataset for use by the processing operation. The UpdateDataSet function places the changes made to the typed dataset back into the database. FIG. 7a presents an illustrative set of processing code that implements the FillDataSet operation for a particular command adapter. Similarly, FIG. 7b presents an illustrative set of processing code that implements the UpdateDataSet operation for a particular command adapter. The example code shown in FIGS. 7a and 7b is modified simply by replacing the "XXXX" with the particular name for the command adapter.

FIGS. 8a and 8b illustrate an example set of programming instructions used to implement FillAllDataSet and UpdateAllDataSet functions according to one embodiment of the present invention. In a preferred embodiment, only a FillAllDataSet function and an UpdateAllDataSet function will be exposed for access by a remote client process. These functions are shown in FIGS. 8a and 8b. FIG. 8a provides a FillAllDataSet function 801 that contains an instruction 802 filling the data into the dataset that corresponds to each command adapter present in the programmable data object. FIG. 8b provides a UpdateAllDataSet function 811 that contains an instruction 812 updating the data into the dataset that corresponds to each command adapter present in the programmable data object.

FIG. 9 illustrates an example class programming object created by a component designer module according to the example embodiment of the present invention presented in FIG. 4. The PurchaseOrder typed dataset 900 has three records corresponding to the three database tables 411-413 included in the programmable data object. In this example the Customer Table Record 901 has at least three fields: a Customer ID 911, a Customer Name 912, and a Customer Address 913. Of course, other fields may be present.

The Order Table Record 903 also has at least three files: a Customer ID 921, an Order ID 922, and an Order Date 923.

Of course, other fields may be present. The Customer ID 921 in the Order Table Record 902 corresponds to the Customer ID 911 field in the Customer Table Record 901, and defines one relationship maintained from the database schema.

The OrderDetail Table Record 903 has at least four fields: an Order ID 931, an Item ID 932, an Item Quantity 933, and an Item Description 934. Of course, other fields may be present. As above, the Order ID 922 in the Order Table Record 902 corresponds to the Order ID 931 field in the OrderDetail Table Record 903, and defines another relationship maintained from the database schema.

The public processing functions FillAllDataSet 941 and UpdateAllDataSet 942 are contained within the processing source code generated for the Middle Tier Data Object 403. Within the FillAllDataSet 941, a call to each of the Fill DataSet functions for the three command adapters are shown. In the FillDataSet function, the order in which the three adapters are filled is set to be top down as defined by the hierarchical definition of the database schema. As such, Customers are filled first, followed by Orders, and then OrderDetails. This order is needed to ensure the proper relationships between the data records as defined by the schema discussed above.

The UpdateAllDataSet 942, however, operates in a bottom up manner first performing the delete operations 943 and then the insert and update operations 944. This bottom up sequence is also needed to correctly update the database.

Figure 10:
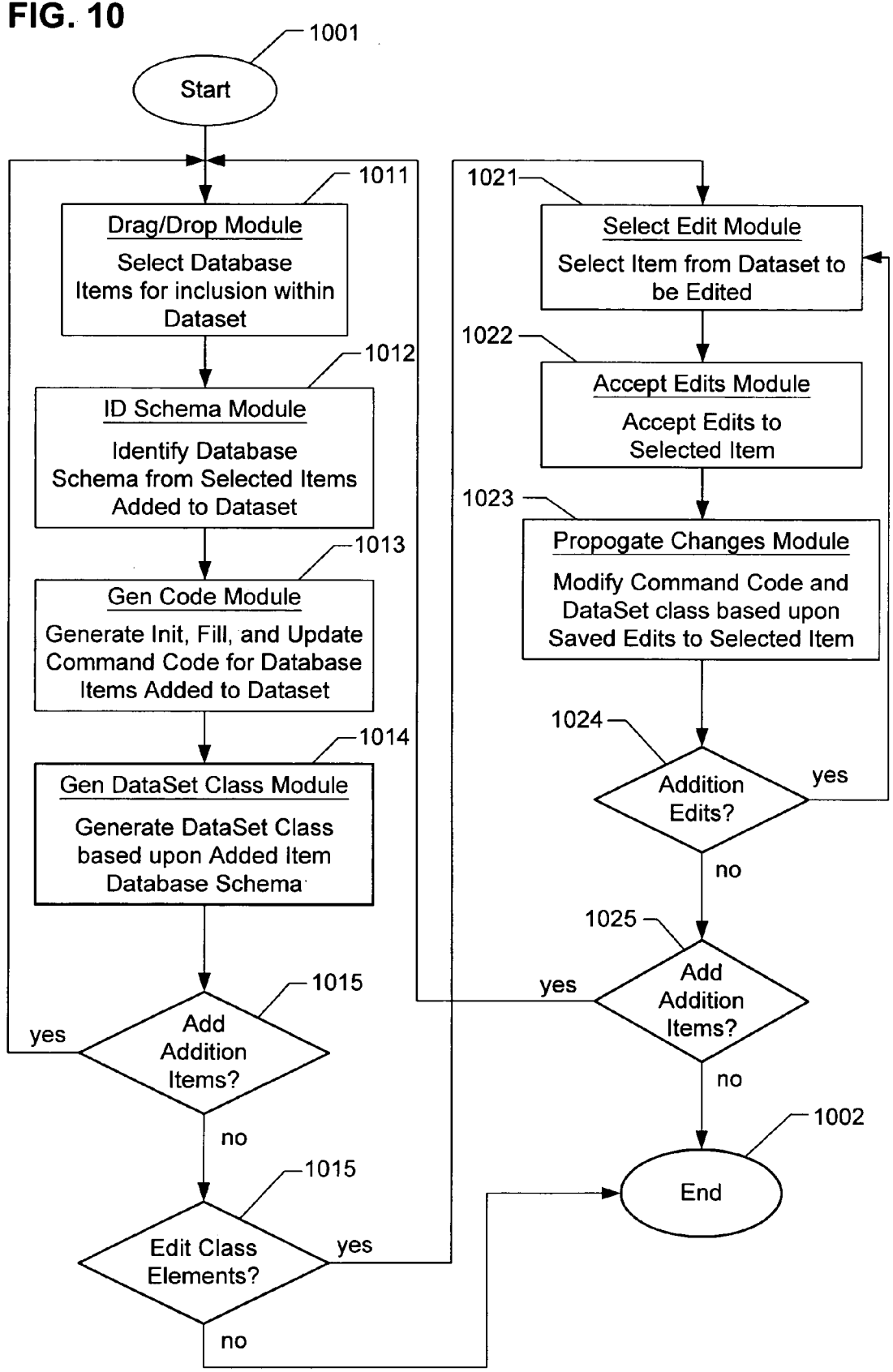
FIG. 10 illustrates an operational flow diagram for creating an example class programming object created by a component designer module according to one embodiment of the present invention.

FIG. 10 illustrates an operational flow diagram for creating an example programmable data object created by a component designer module according to one embodiment of the present invention. The operational flow starts 1001 and a Drag/Drop module 1011 accepts programmers inputs to select a server resource, such as a database table, and inserts the processing item onto the visual component design surface. An ID Schema module 1012 identifies any database schema information, including a database table definition, a set of relationships between the database table's fields and other database tables, and any database views that are to be preserved in the programmable data object being created.

A Gen Code module 1013 generates the processing instructions to implement the Init, FillDataSet and UpdateDataSet functions needed to support the processing resources or command adapter being added to the data object. This processing instructions may be generated in any desired programming language as long as the sequence of instructions implement the Init, Fill and Update functions.

Next, a Gen DataSet Class module 1014 generates a typed dataset based upon the processing resource being added to the data processing object. If the typed dataset exists, the new data structures are added to the typed dataset with all relationships between the fields within the records present in the typed dataset and the fields within the newly added record being included within the dataset. Once the typed dataset in specified, the programmable data object is complete.

Test operation 1015 determines, based upon an input from the programmer, if additional processing items are to be added to the programmable data object. If test operation 1015 determines more processing items are to be added, the processing returns to the Drag/Drop module 1011 to add the new processing item. If test operation 1015 determines more processing items are not to be added, test operation 1016 determines if any processing items are to be edited.

If test operation 1016 determines no processing items are to be edited, the processing ends 1002. If test operation 1016 determines at least one processing item is to be edited, the processing continues with Select Edit module 1021.

Select Edit module 1021 accepts the identity of a processing item from the data processing object that is to be edited and displays the properties and source code for the item to the programmer for inspection. Accept Edits module 1022 accepts one or more instructions from the programmer to change the properties and source code for the selected processing item. Once all of the edits have been made, a Propagate Changes module 1023 modifies the selected processing item, its data structures, and its processing functions and methods to implement the edit made by the programmer. The Propagate Changes module 1023 identifies all other processing items in the data processing object that are affected by the edits made to the selected processing item. The Propagate Change module 1023 updates all processing items containing data structures and processing modules changed by the edits to the selected processing item in order to make all of the edits consistent within all items in the programmable data object.

Test operation 1024 determines, based upon an input from the programmer, if additional processing items are to be edited. If test operation 1024 determines more processing items are to be edited, the processing returns to the Select Edit module 1021 to edit the next processing item. If test operation 1024 determines that no more processing items are be edited, test operation 1025 determines if any additional processing items are to be added to the programmable data object.

If test operation 1025 determines no additional processing items are to be added, the processing ends 1002. If test operation 1025 determines at least one more processing item is to be added, the processing returns to the Drag/Drop module 1011. The processing continues until all processing items have been added and edited.

The logical operations of the various embodiments illustrated herein are implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of creating programmable data objects for use in a multi-tier computing architecture, the method comprising:

dragging a graphical representation for a server processing resource from a server explorer module to a visual design surface module to add a processing item to a middle-tier stateless programmable data object being created in the visual design surface module, wherein a client process communicates with the server processing resource through the middle-tier stateless programmable data object using stateless data transfer, wherein stateless data transfer includes receiving a message from the client at the server processing resource that includes:
- a first indicia that indicates an original state of data previously requested by the client from the server processing resource; and
- a second indicia that indicates changes to the requested data, wherein a current state of the requested data is determined by comparing the first indicia and the second indicia;

identifying data schema associated with the server processing resource added to the middle-tier stateless programmable data object in response to the server processing resource being dropped in the visual design surface module;

creating a typed dataset containing data structures corresponding to the data schema associated with the server processing resource;

creating a command adapter to provide data transfer commands within the middle-tier stateless programmable data object between the middle-tier stateless programmable data object and the server processing resource; and creating a data transfer connection between the middle-tier stateless programmable data object and the server processing resource.

2. The method according to claim 1, wherein the method further comprises: creating additional initialization methods to support the items added to the middle-tier stateless programmable data object.

3. A computing system of creating programmable data objects for use in a multi-tier computing architecture, the computing system comprising:
- a memory module;
- a user interface module;
- a mass storage system; and
- a programmable processing module, the programmable processing module performing a sequence of operations to implement the following:
  - dragging a graphical representation for a server processing resource from a server explorer module to a visual design surface module to add a processing item to a middle-tier stateless programmable data object being created in the visual design surface module, wherein a client process communicates with the server processing resource through the middle-tier stateless programmable data object using stateless data transfer, wherein stateless data transfer includes receiving a message from the client at the server processing resource that includes:
    - a first indicia that indicates an original state of data previously requested by the client from the server processing resource; and
    - a second indicia that indicates changes to the requested data, wherein a current state of the requested data is determined by comparing the first indicia and the second indicia;
  - identifying data schema associated with the server processing resource added to the middle-tier stateless programmable data object in response to the server processing resource being dropped in the visual design surface module;
  - creating a typed dataset containing data structures corresponding to the data schema associated with the server processing resource;
  - creating a command adapter to provide data transfer commands within the middle-tier stateless programmable data object between the middle-tier stateless programmable data object and the server processing resource; and
  - creating a data transfer connection between the middle-tier stateless programmable data object and the server processing resource.

4. The computing system according to claim 3, wherein the sequence of operations further comprises creating additional initialization methods to support the items added to the middle-tier stateless programmable data object.

5. A computer program product readable by a computing system and encoding instructions for a computing process for creating programmable data objects for use in a multi-tier computing architecture the computing process comprising:
- dragging a graphical representation for a server processing resource from a server explorer module to a visual design surface module to add a processing item to a middle-tier stateless programmable data object being created in the visual design surface module, wherein a client process communicates with the server processing resource through the middle-tier stateless programmable data object using stateless data transfer, wherein stateless data transfer includes receiving a message from the client at the server processing resource that includes:
  - a first indicia that indicates an original state of data previously requested by the client from the server processing resource; and
  - a second indicia that indicates changes to the requested data, wherein a current state of the requested data is determined by comparing the first indicia and the second indicia;
- identifying data schema associated with the server processing resource added to the middle-tier stateless programmable data object in response to the server processing resource being dropped in the visual design surface module;
- creating a typed dataset containing data structures corresponding to the data schema associated with the server processing resource;
- creating a command adapter to provide data transfer commands within the middle-tier stateless programmable data object between the middle-tier stateless programmable data object and the server processing resource; and
- creating a data transfer connection between the middle-tier stateless programmable data object and the server processing resource.

6. The computer program product according to claim 5, wherein the computing process further comprises creating additional initialization methods to support the items added to the middle-tier stateless programmable data object.

7. A system comprising a processor executing instructions for creating programmable data objects for use in a multi-tier computing architecture, the system comprising:
- a server explorer module for presenting one or more server resources present on a server to a programmer for use in creating a programming object class; and
- a visual design surface module for performing the operations associated with creating, editing, and saving a middle-tier stateless programmable data object, the visual design surface module comprising:
  - a drag/drop module for enabling a programmer to perform a drag and drop of a server resource onto the visual design surface module, the drag and drop including selecting a server resource from the server explorer module and placing the selected server resource within the middle-tier stateless programmable data object on the visual design surface module, wherein a client process communicates with the server resource through the middle-tier stateless programmable data object using stateless data transfer, wherein stateless data transfer includes receiving a message from the client at the server resource that includes:
  a first indicia that indicates an original state of data previously requested by the client from the server resource; and
  a second indicia that indicates changes to the requested data, wherein a current state of the requested data is determined by comparing the first indicia and the second indicia;
a command adapter function generation module for generating a command adapter module associated with the drag and drop of the server resource;
a typed dataset generation module for generating a typed dataset object associated with the drag and drop of the server resource;
an init generation module for generating processing functions and methods of a data transfer connection between the middle-tier stateless programmable data object and the server resource associated with the drag and drop of the server resource; and
a properties edit module for retrieving properties and source code for objects within the visual design surface module for editing.

8. The system according to claim 7, wherein the drag/drop module comprises:
  an explorer interface module to select the server resource from the server explorer module and place it within the middle-tier stateless programmable data object within the visual design surface module;
  a user interface module to perform the visual display and command input operations associated with the drag and drop; and
  a class generation module to cause the visual design surface module to perform the operations to complete the drag and drop of the server resource onto the visual design surface module.

9. The system according to claim 7, wherein the drag/drop module further causes the other processing modules in the visual design surface module to perform their operations to complete the drag and drop of the server resource onto the visual design surface module.

10. The system according to claim 7, wherein the command adapter function generation module comprises:
  a GetDS module for generating a GetDataSet function that fills a typed dataset with data obtained from the server resource; and
  an updateDS module for generating an UpdateDataSet function that updates the server resource using the data stored within the typed dataset.

11. The system according to claim 7, wherein the command adapter function generation module further accepts an updated command adapter module that has been edited by the properties edit module and generates updated source code for functions within the command adapter module.

12. The system according to claim 7, wherein the typed dataset generation module comprises:
  a Table Schema module for generating the table records from a database schema within the typed dataset object;
  a Relations module for generating the relationship data for the fields within the records within the typed dataset object based upon the corresponding relationship data from the server resource; and
  a Views module for generating the database views data for the records within the typed dataset object based upon the corresponding views data from the server resource.

13. The system according to claim 7, wherein the typed dataset generation module further accepts an updated typed dataset module that has been edited by the properties edit module and generates updated source code for functions within the typed dataset object.

14. The system according to claim 7, wherein the init generation module comprises:
  an Init Function module for generating the processing functions and methods within the middle-tier stateless programmable data object associated with the command adapter modules;
  an InitDataSet module for generating the processing functions and methods within the middle-tier stateless programmable data object module associated with the type dataset class; and
  an InitConnection module for generating the processing functions and methods within the middle-tier stateless programmable data object associated with the data transfer connection between the middle-tier stateless programmable data object and the server resource.

15. The system according to claim 7, wherein the init generation module further accepts an updated Code Generated Method module that has been edited by the properties edit module and generates updated source code for the functions and methods of the data transfer connection.

16. The method according to claim 1, further comprising:
  inserting a database connection module that creates the data transfer connection between the middle-tier stateless programmable data object and the server processing resource when the dragged item is a database table within the server processing resource, wherein the database connection module comprises:
    a data connection object for creating and managing the data transfer connection between the middle-tier stateless programmable data object and the server processing resource;
    a managed resource module for providing the data connection object with address and identification information to establish the data transfer connection; and
    a persistent data storage for maintaining the address and identification information used by the managed resource module.

17. The computing system according to claim 3, wherein the programmable processing module further performs the following:
  inserting a database connection module that creates the data transfer connection between the middle-tier stateless programmable data object and the server processing resource when the dragged item is a database table within the server processing resource, wherein the database connection module comprises:
    a data connection object for creating and managing the data transfer connection between the middle-tier stateless programmable data object and the server processing resource;
    a managed resource module for providing the data connection object with address and identification information to establish the data transfer connection; and
    a persistent data storage for maintaining the address and identification information used by the managed resource module.

18. The computer program product according to claim 5, wherein the computing process further comprises:

inserting a database connection module that creates the data transfer connection between the middle-tier stateless programmable data object and the server processing resource when the dragged item is a database table within the server processing resource, wherein the database connection module comprises:

a data connection object for creating and managing the data transfer connection between the middle-tier stateless programmable data object and the server processing resource;

a managed resource module for providing the data connection object with address and identification information to establish the data transfer connection; and a persistent data storage for maintaining the address and identification information used by the managed resource module.

19. The system according to claim 7, wherein the properties edit module further comprises:

a Properties Retrieval module for retrieving the properties and source code for the objects within the visual design surface module for editing;

a User Interface module for presenting the properties and source code to a programmer, and accepting edits from the programmer; and a Class Update module for identifying all other items within the visual design surface module that are affected by the changes made to the edited item and updating the identified items consistent with the edits made to the edited item.

20. The method according to claim 1, further comprising:

editing the processing items within the visual design surface module, wherein the processing items comprise properties and processing instruction source code;

updating the processing items edited within the visual design surface module;

updating the typed dataset within the visual design surface module;

updating the command adapters within the visual design surface module;

identifying any other processing items containing references to the data structures and functions edited; and updating the identified items containing references to data structures and functions edited to make all references consistent with each other.

21. The computing system of claim 3 wherein the sequence of operations further comprises:

editing the processing items within the visual design surface module, wherein the processing items comprise properties and processing instruction source code;

updating the processing items edited within the visual design surface module;

updating the typed dataset within the visual design surface module;

updating the command adapters within the visual design surface module;

identifying any other processing items containing references to data structures and functions edited; and updating the identified items containing references to the data structures and functions edited to make all references consistent with each other.

22. The computer program product according to claim 5, wherein the computing process further comprises:

editing the processing items within the visual design surface module, wherein the processing items comprise properties and processing instruction source code;

updating the processing items edited within the visual design surface module;

updating the typed dataset within the visual design surface module;

updating the command adapters within the visual design surface module;

identifying any other processing items containing references to data structures and functions edited; and updating the identified items containing references to the data structures and functions edited to make all references consistent with each other.

23. The system according to claim 7, further comprising a database connection module for creating the data transfer connection between the middle-tier stateless programmable data object and the server resource, wherein the server resource includes a database table, the database connection module including:

a data connection object for creating and managing the data transfer connection between the middle-tier stateless programmable data object and the server resource;

a managed resource module for providing the data connection object with address and identification information to establish the data transfer connection; and a persistent data storage for maintaining the address and identification information used by the managed resource module.

* * * * *